(12) United States Patent
Nejat et al.

(10) Patent No.: US 11,669,295 B2
(45) Date of Patent: Jun. 6, 2023

(54) MULTIPLE OUTPUT CONTROL BASED ON USER INPUT

(71) Applicant: SONY GROUP CORPORATION, Tokyo (JP)

(72) Inventors: Mahyar Nejat, San Diego, CA (US); Brant Candelore, San Diego, CA (US); Peter Shintani, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/905,045

(22) Filed: Jun. 18, 2020

(65) Prior Publication Data

US 2021/0397405 A1 Dec. 23, 2021

(51) Int. Cl.
| | |
|---|---|
| *G06F 3/16* | (2006.01) |
| *G09B 21/00* | (2006.01) |
| *H04R 3/00* | (2006.01) |
| *G10L 13/00* | (2006.01) |
| *G06V 40/10* | (2022.01) |

(52) U.S. Cl.
CPC .............. *G06F 3/165* (2013.01); *G06V 40/10* (2022.01); *G09B 21/006* (2013.01); *G10L 13/00* (2013.01); *H04R 3/00* (2013.01); *G09B 21/004* (2013.01); *H04R 2420/07* (2013.01); *H04R 2420/09* (2013.01)

(58) Field of Classification Search
CPC .. G06F 3/165; G06K 9/00362; G09B 21/006; G09B 21/004; G10L 13/00; H04R 3/00; H04R 2420/07; H04R 2420/09
See application file for complete search history.

(56) References Cited

U.S. PATENT DOCUMENTS

| | | | |
|---|---|---|---|
| 6,483,568 B1* | 11/2002 | Folio | G11B 27/10 352/20 |
| 7,212,247 B2 | 5/2007 | Albean | |
| 7,742,740 B2 | 6/2010 | Goldberg et al. | |
| 7,757,258 B2* | 7/2010 | Muench-Casanova | H04N 21/8106 725/75 |
| 8,760,575 B2 | 6/2014 | Gagnon et al. | |
| 8,990,848 B2* | 3/2015 | Basso | H04N 21/4325 725/32 |
| 9,191,639 B2* | 11/2015 | Kuspa | G10L 25/57 |
| 9,451,335 B2 | 9/2016 | Gopalan et al. | |
| 10,459,686 B1* | 10/2019 | Lenke | G11B 27/038 |
| 10,740,063 B2* | 8/2020 | Gusikhin | G06F 3/165 |
| 10,747,497 B2* | 8/2020 | Lenke | G06F 3/165 |
| 10,999,566 B1* | 5/2021 | Mahyar | G10L 17/00 |
| 11,190,855 B2* | 11/2021 | Kahn | H04N 21/2368 |

(Continued)

*Primary Examiner* — Joseph Saunders, Jr.
(74) *Attorney, Agent, or Firm* — Chip Law Group

(57) ABSTRACT

A media control device is provided. The media control device includes a first output port and a second output port. The media control device receives a user input indicative of disability information of a user. Further, the media control device controls the first output port to output a first audio portion of media content. The media control device further retrieves a second audio portion which describes a first image portion of the media content based on the received user input. The first image portion is associated with the first audio portion. The media control device further controls the second output port to output the first audio portion and the second audio portion based on the received user input.

20 Claims, 6 Drawing Sheets

(56) References Cited

U.S. PATENT DOCUMENTS

| | | | |
|---|---|---|---|
| 2003/0216922 A1* | 11/2003 | Gonzales | G06F 40/58 704/260 |
| 2004/0196405 A1* | 10/2004 | Spinelli | H04N 21/8106 348/565 |
| 2007/0124777 A1* | 5/2007 | Bennett | H04N 21/4363 725/78 |
| 2008/0063215 A1* | 3/2008 | Porwal | H04N 21/4341 381/77 |
| 2008/0118078 A1* | 5/2008 | Asada | H04S 3/008 381/74 |
| 2008/0219637 A1* | 9/2008 | San | G11B 27/10 386/201 |
| 2010/0023964 A1* | 1/2010 | Basso | H04N 21/8456 725/32 |
| 2010/0100581 A1* | 4/2010 | Landow | H04L 67/02 709/203 |
| 2013/0120654 A1* | 5/2013 | Kuspa | G10L 25/57 348/E9.034 |
| 2014/0022456 A1* | 1/2014 | Casagrande | H04N 21/4341 348/515 |
| 2014/0344839 A1 | 11/2014 | Woods | |
| 2015/0078595 A1* | 3/2015 | Shintani | H04S 7/303 381/303 |
| 2015/0103154 A1 | 4/2015 | Candelore | |
| 2015/0149902 A1 | 5/2015 | Zavesky | |
| 2015/0301788 A1* | 10/2015 | Johnston | H04N 21/4307 700/94 |
| 2016/0098395 A1* | 4/2016 | DuBose | G10L 15/26 704/2 |
| 2019/0069045 A1* | 2/2019 | Kahn | H04N 21/2368 |
| 2020/0057601 A1* | 2/2020 | Lenke | G11B 27/038 |
| 2020/0174737 A1* | 6/2020 | Gusikhin | G06F 3/165 |
| 2020/0204878 A1* | 6/2020 | Canton | H04N 21/84 |
| 2021/0151082 A1* | 5/2021 | Wang | H04N 21/84 |

* cited by examiner

MULTIPLE OUTPUT CONTROL BASED ON USER INPUT

REFERENCE

None.

FIELD

Various embodiments of the disclosure relate to output control of a media control device. More specifically, various embodiments of the disclosure relate to an apparatus and a method for control of output ports of the media control device based on user inputs.

BACKGROUND

Recent advancements in the field of media content reproduction have led to development of various techniques to control media control devices (for example, televisions). In certain situations, rendered media content (for example audio-video content) may include reproduction of descriptive information, as accessibility information, which may describe currently rendered video portion of the media content. In a shared viewing environment, which may include multiple people including both abled users and disabled users (such as visually impaired), the reproduction of the descriptive information in the media content may be unessential and may not be desired by certain users (for example the abled users).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A media control device and method of control of output ports of the media control device, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
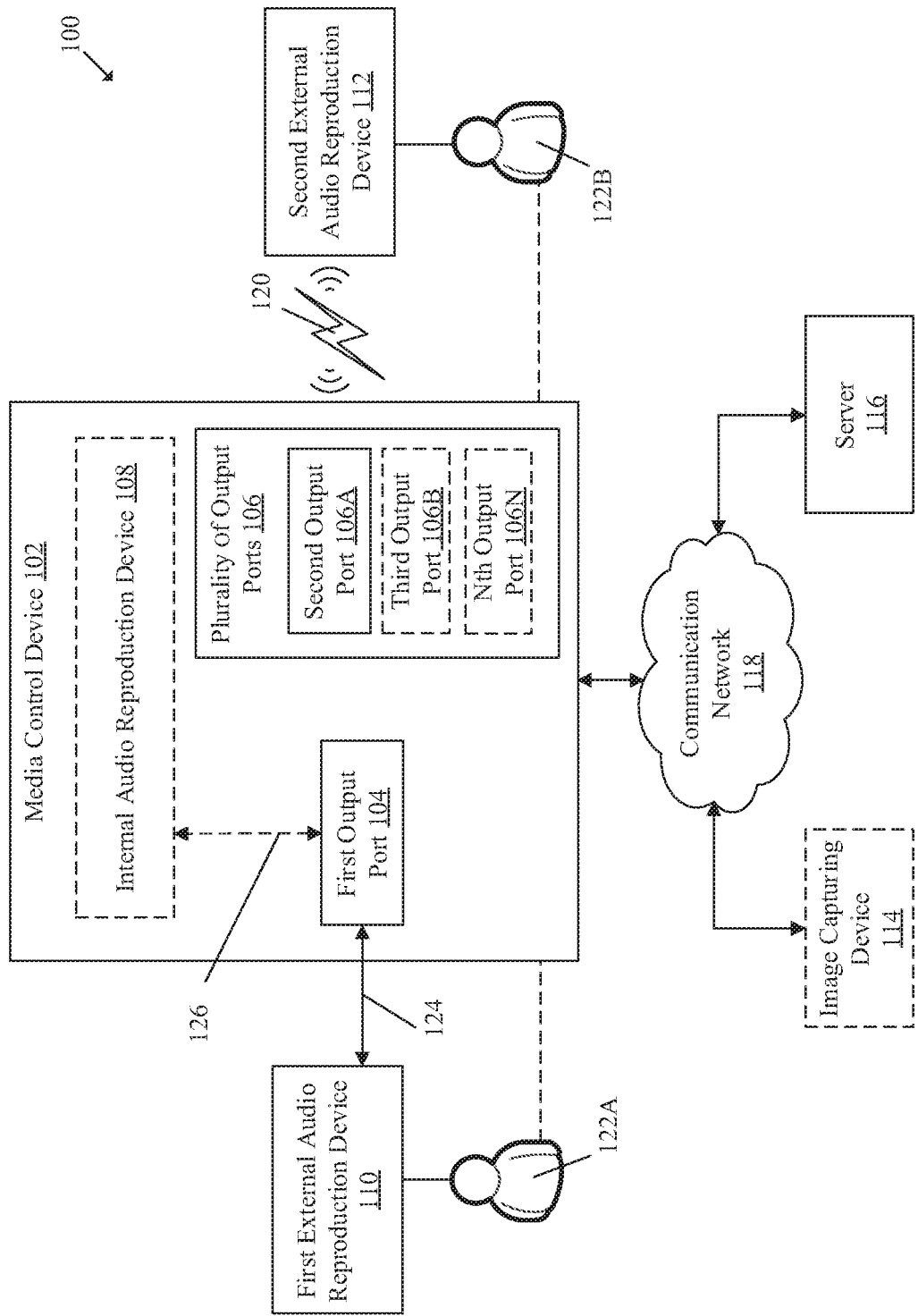
FIG. 1 is a block diagram that illustrates an exemplary network environment for control of output ports of a media control device based on user inputs, in accordance with an embodiment of the disclosure.

The following described implementations may be found in the disclosed media control device and method to control output of different audio portions of the media content as per viewer's preferences. Exemplary aspects of the disclosure provide a media control device (for example, a television) which may include a plurality of output ports to output various audio portions (for example, but not limited to, dialogues, video description) of the media content (for example audio-video content such as movies) based on preferences of viewers of the media content. The media control device may be configured to receive a user input indicative of disability information (for example, information about visual impairment) of a user (such as a viewer). The user input may correspond to a preference of the user. Further, the media control device is configured to control a first output port of the plurality of output ports to output a first audio portion (for example, dialogues and background music) of the media content. The media control device is further configured to control a second output port of the plurality of output ports to output the first audio portion and a second audio portion (for example, an audio form of a description of an image portion of the media content) based on the received user input (i.e. preference). Examples of the description of the image portion may include, but are not limited to, description of a character in the media content, description of a location of a rendered scene of the media content, description of environmental condition in the scene of the media content, or description of a text appearing in the scene of the media content. The image portion may be an image frame, a shot, or scene rendered on the media control device along with the output of the first audio portion, via the first output port.

The media content rendered on the media control device may be accessed or viewed by one user (for example a viewer that may be an abled user or a disabled user) or may be accessed in a shared viewing environment that may include multiple users (i.e. the abled user as well as the disabled user, like visually impaired) who may access the media content collectively. In the shared viewing environment, the users may have different requirements or preferences associated with the audio of the media content. For example, the abled user may not require the second audio portion (i.e. audio form of the description of the image portion) of the media content, whereas the disabled user (such as a visually impaired user) may require the second audio portion to understand the rendered media content. Therefore, the disclosed media control device may control the output of the first audio portion (i.e., the audio dialogue without audio description of the image portion), via the first output port for the abled user, and also control the output of both the first audio portion and the second audio portion (i.e. the audio form of the description of the image portion), via the second port for the disabled user. Thus, in the shared viewing environment, the different audio portions of the media content may be rendered to multiple users (the abled user and the disabled user) concurrently, based on the preferences of one of the user (for example the disabled user).

Moreover, as the second audio portion is withheld from the first output port, the render of the second audio portion on the second output port may not distract or disturb the abled user who may receive only the first audio portion, via the first output port. Furthermore, the disabled user may be able to experience the rendered media content with both the first audio portion and the second audio portion (i.e. the audio form of the image/video description) via the second output port, as required or preferred by the disabled user. Therefore, the disclosed media control device may output different portions of the media content to both the abled user as well as the disabled user collectively in the shared view environment based on respective preferences.

It may be understood that in some implementations, the media control device may receive or pre-store two separate audio tracks—a first track including the audio form of the description of the image portion (like track including the combination of the first audio portion, such as dialogues, and the second audio portion), and a second track without the audio form of the description of the image portion (like only the first audio portion). The first track including the audio description of the image portion and the dialogues may be rendered directly, via the second port by the media control device for the disabled user. The media control device may decode two completely separate audio tracks to extract the first track and the second track. In some embodiments, the first track may only include audio form of the description of the image portion as the second audio portion, but not the first audio portion. In such case, the media control device may consequently merge the first track (including the audio form of the description) with the second track (including the dialogues without the description) to create a combined audio to be rendered, via the second port for the disabled user. In some other embodiments, the media control device may receive or store the description of the image portion (i.e. video description) in a text form, and the media control device may further perform a text-to-speech operation to convert the text form into the audio form, to be further merged with the second track (including the dialogues without the description) to create the combined audio to be rendered, via the second port for the disabled user. In all aforementioned embodiments, either the image portion (i.e. video description) may be received in an entire audio track or just as in the text form, the disclosed media control device may automatically control the image portion to be rendered in the audio form (i.e. second audio portion) to a port (i.e. second audio port) that may be a separate port from the first audio port, through which the first audio portion (i.e. which does not contain description) may be rendered.

FIG. 1 is a block diagram that illustrates an exemplary network environment for control of output ports of a media control device based on user inputs, in accordance with an embodiment of the disclosure. With reference to FIG. 1, there is shown a network environment 100. The network environment 100 may include a media control device 102 which may further include a first output port 104, a plurality of output ports 106, and internal audio reproduction device 108. The plurality of output ports 106 may include a second output port 106A, a third output port 1068, and a Nth output port 106N. As shown in FIG. 1, the network environment 100 may further include a first external audio reproduction device 110, a second external audio reproduction device 112, an image capturing device 114, a server 116, and a communication network 118. The media control device 102, the image capturing device 114, and the server 116 may be coupled with each other, via the communication network 118. Further, the second external audio reproduction device 112 may be coupled to the media control device 102 via a wireless communication medium 120, as shown in FIG. 1.

As shown in FIG. 1, the network environment 100 may further include the first user 122A and the second user 122B associated with the media control device 102. The first user 122A and the second user 122B may be the users or viewers to whom the media control device 102 renders media content (for example audio-video content). In an embodiment, the first user 122A be an abled user and the second user be a disabled user (for example a visually impaired user). Although in FIG. 1, the image capturing device 114 is shown separated from the media control device 102, the disclosure is not so limited. In some embodiments, the image capturing device 114 may be integrated in the media control device 102, without a deviation from the scope of the disclosure.

The media control device 102 may comprise suitable logic, circuitry, interfaces, and/or code that may be configured to control output of different audio portions of the media content as per viewer's preferences. The media control device 102 may be configured to communicate with the server 116 to receive the media content including the audio portions of the media content. In accordance with an embodiment, the media control device 102 may be further configured to store the media content received from the server 116. The media control device 102 may be further configured to receive the user input indicative of disability information of the user (for example the second user 122B) and may control the first output port to output the first audio portion of the media content. The media control device 102 may be further configured to retrieve the second audio portion which describes a first image portion of the media content based on the received user input and may further control the second output port to output the first audio portion and the second audio portion based on the received user input. Alternatively, in case media control device 102 receives the second audio portion as a completely separate audio track (i.e. which may contain the audio content of the first audio portion), then the media control device 102 may output the second audio portion (i.e. complete audio track), via the second output port based on the received user input. Examples of the media control device 102 may include, but are not limited to, a television, a mobile phone, a smart phone, a tablet computing device, a personal computer, a laptop, a gaming console, a media player, a sound system with display capabilities, a smart audio device, a home theatre system, a digital camera, a head-mounted device, an automotive electronic device, an electronic musical instrument, or other consumer electronic device with media rendering capability.

The first output port 104 may comprise suitable logic, circuitry, and/or interface that may be configured to couple the media control device 102 with the first external audio reproduction device 110. The media control device 102 may output the first audio portion to the first external audio reproduction device 110, via the first output port 104. Examples of the first output port 104 may include, but are not limited to, a universal serial bus (USB) audio port, a 3.5 millimeter (mm) audio port, a 2.5 mm audio port, a 6.3 mm audio port, a Radio corporation of America (RCA) audio port, a High-Definition Multimedia Interface (HDMI) audio port, an HDMI Audio return channel (ARC) audio port, or an optical audio port. In some embodiments, the first output port 104 may couple the media control device 102 and the first external audio reproduction device 110 through a wired connection or cable 124 as shown in FIG. 1. Examples of the wired cable 124 may include, but are not limited to, a USB cable, a 6.3/3.5/2.5 mm cable, an RCA cable, an HDMI cable, an HDMI ARC cable, or wired cable capable to transmit audio signals. In some embodiments, the first output port 104 may be internally connected with the internal audio reproduction device 108, via a wired connection 126 as shown in FIG. 1.

It may be noted that the wired connection or cable 124 between the media control device 102 and the first external audio reproduction device 110, shown in FIG. 1, is presented merely as an example. The present disclosure may be also applicable to other scenario, where the first output port 104 may couple the media control device 102 with the first external audio reproduction device 110 through the wireless communication medium 120. In such scenario, the examples of the first output port 104 may include, but are not limited to, Bluetooth® audio port, Wi-Fi audio port, Zigbee® audio port, near-field communication ports, or short-range communication ports.

The second output port 106A may comprise suitable logic, circuitry, and/or interface that may be configured to couple the media control device 102 with the second external audio reproduction device 112 (for example via the wireless communication medium 120). The media control device 102 may output the second audio portion (i.e. descriptions) as well as the first audio portion (i.e. dialogues) to the second external audio reproduction device 112, via the second output port 106A. Examples of the second output port 106A may include, but are not limited, wireless audio ports such as Bluetooth® audio port, Wi-Fi audio port, Zigbee® audio port, near-field communication ports, or short-range communication ports. It may be noted that the wireless communication medium 120 between the media control device 102 and the second external audio reproduction device 112, shown in FIG. 1, is presented merely as an example. The present disclosure may be also applicable to other scenario, where the second output port 106A may couple the media control device 102 and the second external audio reproduction device 112 through the wired connection (such as the wired connection or cable 124). In such scenario, the examples of the second output port 106A may include, but are not limited to, and wired audio ports such as USB ports, 3.5/2.5/6.3 mm audio port, optical audio ports, HDMI audio ports, HDMI ARC audio ports, or RCA audio port.

The internal audio reproduction device 108 may include suitable logic, circuitry, and/or interfaces that may be configured to playback an audio output, such as the first audio portion of the media content. The internal audio reproduction device 108 may be configured to receive electrical audio signals related the first audio portion from circuitry (shown in FIG. 2) of the media control device 102, and convert the received electrical audio signals into the audio/sound output. Examples of the internal audio reproduction device 108 may include, but are not limited to, a speaker, a loudspeaker, a woofer, a sub-woofer, a tweeter, a wireless speaker, a monitor speaker, or other speakers or sound output device. The internal audio reproduction device 108 may an in-built speaker or integrated in the media control device 102 as shown in FIG. 1.

The first external audio reproduction device 110 may include suitable logic, circuitry, and/or interfaces that may be configured to playback an audio output, such as the first audio portion and/or the second audio portion of the media content. The first external audio reproduction device 110 may be configured to receive electrical audio signals related to either of the first audio portion or the second audio portion from the media control device 102, and convert the received electrical audio signals into the audio/sound output. In some embodiments, the first external audio reproduction device 110 may be communicatively coupled to the media control device 102 via the first output port 104 and the wired connection or the cable 124 (or the wireless communication medium 120). Examples of the first external audio reproduction device 110 may include, but are not limited to, a headphone, an earphone, a handsfree, a wireless earphone, a wireless headset, a loudspeaker, a wireless speaker, a sound bar, a Bluetooth® (Audio Video) AV system, a Bluetooth® soundbar.

The functions of the second external audio reproduction device 112 may be same as the functions of the first external audio reproduction device 110 described, for example, in FIG. 1. Therefore, the description of the second external audio reproduction device 112 is omitted from the disclosure for the sake of brevity.

The image capturing device 114 may comprise suitable logic, circuitry, interfaces, and/or code that may be configured to capture one or more images of the users, such as the first user 122A or the second user 122B. In accordance with an embodiment, the image capturing device 114 may capture the one or more images on receipt of one or more control instructions from the media control device 102. The one or more images may indicate the disability information of the user (such as the second user 122B with visual impairment disability). Examples of the image capturing device 114 may include, but are not limited to, an image sensor, a wide-angle camera, a 360-degree camera, an action camera, a closed-circuit television (CCTV) camera, a camcorder, a digital camera, camera phones, a time-of-flight camera (ToF camera), a night-vision camera, and/or other image capture devices.

The server 116 may comprise suitable logic, circuitry, interfaces, and/or code that may be configured to communicate with the media control device 102, via the communication network 118. The server 116 may be configured to store the media content for distribution to the media control device 102. The server 116 may receive a content request from the media control device 102, and may provide the stored media content to the media control device 102 based on the received content request. Examples of the server 116 may include, but are not limited to, an application server, a media content server, a cloud server, a mainframe server, a database server, a file server, a web server, or other types of servers.

The communication network 118 may include a communication medium through which the media control device 102, the image capturing device 114 and the server 116 may communicate with each other. Examples of the communication network 118 may include, but are not limited to, the Internet, a cloud network, a Wireless Fidelity (Wi-Fi) network, a Personal Area Network (PAN), a Local Area Network (LAN), or a Metropolitan Area Network (MAN). Various entities in the network environment 100, such as the server 116 and the image capturing device 114 may be configured to connect to the communication network 118, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication and wireless access point (AP).

The wireless communication medium 120 may include a wireless communication channel through which the media control device 102 and the second external audio reproduction device 112 (or the first external audio reproduction device 110) may communicate with each other, wirelessly. Examples of the wireless communication medium 120 may include, but are not limited to, short range communication technologies, such as a Wireless Fidelity (Wi-Fi) network, a near field communication (NFC) channel, and a Bluetooth® (BT) communication network. Various entities in the network environment 100, such as the second external audio reproduction device 112 may be configured to connect to the wireless communication medium 120, in accordance with various wireless communication protocols. Examples of such wireless communication protocols may include, but are not limited to, at least one of wireless device-to-device communication protocols, or Bluetooth® communication protocols.

In operation, the media control device 102 may receive a user input indicative of disability information of a user (for example the second user 122B). The disability information associated with the second user 122B may affirm the presence of disability (such as visual disability) in the second user 122B. In accordance with an embodiment, the user input may be received from the first user 122A or the second user 122B about the visual disability in the second user 122B. In an example, the media control device 102 may receive the user input as "visually abled" from the first user 122A and may receive another user input as "visually disabled" from the second user 122B. The user input from the second user 122B (i.e. visually impaired) may indicate that the second user 122B wants the first audio portion (i.e. dialogues) and the second audio portion (i.e. description) in the audio form to understand the image portion of the media content. Similarly, the user input from the first user 122A (i.e. visually abled) may indicate that the first user 122A does not want the second audio portion (i.e. description) in the audio form. In some embodiments, the media control device 102 may control the image capturing device 114 to capture an image of the first user 122A and/or the second user 122B to determine the disability information, as the user input, of one/both of the first user 122A and the second user 122B. The receipt of the user input indicative of the disability information and the determination of the disability information based on the image captured by the image capturing device 114 is further explained, for example, in FIG. 3A.

The media control device 102 may be further configured to control the first output port 104 to output a first audio portion of the media content. The first audio portion may correspond to the audio output such as dialogues and/or background music associated with the media content or with a particular frame, a filmed shot, or a filmed scene included in the media content. The details of the output of the first audio portion, via the first output port 104 is described, for example, in FIG. 3A.

The media control device 102 may be further configured to retrieve a second audio portion which may describe a first image portion of the media content based on the received user input. A second audio portion may be an audio form of description information which may describe the first image portion of the media content. In some embodiment, the second audio form may be an audio track which may include the audio form of the description and the first audio portion, as well. The first image portion may include one or more image frames, one or more filmed shots, or a particular filmed scene of the media content. In an embodiment, the filmed scene of the media content may include the one or more filmed shots. The first image portion may be associated with the first audio portion (i.e. dialogues) of the media content. The details of the second audio portion is further described, for example, in FIG. 3A. The second user 122B (for example a visually impaired person) may have a desire to access the second audio portion (i.e. audio description of the first image portion currently being displayed) to understand the first image portion or related context. The media control device 102 may be further configured to control the second output port 106A to output the first audio portion (i.e. dialogues) and the second audio portion (i.e. description) based on the received user input about the disability of the user (for example the second user 122B). The media control device 102 may further control timing of the output of the first audio portion and the second audio portion, via the second output port 106A. The timing control and the output of the first audio portion and the second audio portion, via the second output port 106A are described, for example, in FIGS. 3A-3C. In an embodiment, the first output port 104 may be coupled to the first external audio reproduction device 110 (such as a loudspeaker) through which the first user 122A may access the output first audio portion. In an embodiment, the second output port 106A may be wirelessly coupled to the second external audio reproduction device 112 through which the second user 122B may access the first audio portion along with the second audio portion. Therefore, using the disclosed media control device 102, both the first user 122A (i.e. abled user) and the second user 122B (i.e. visually impaired user) may access or view the media content concurrently in the shared view environment based on respective preferences (i.e. user input about the disability information). The media control device 102 may provide only the first audio portion (i.e. without the second audio portion) at the first output port 104 for the first user 122A, and may provide the first audio portion along with the second audio portion at the second output port 106A for the second user 122B. Thus, in the shared view environment, both the first user 122A and the second user 122B may access the necessary audio parts of the media content as per respective preferences.

Figure 2:
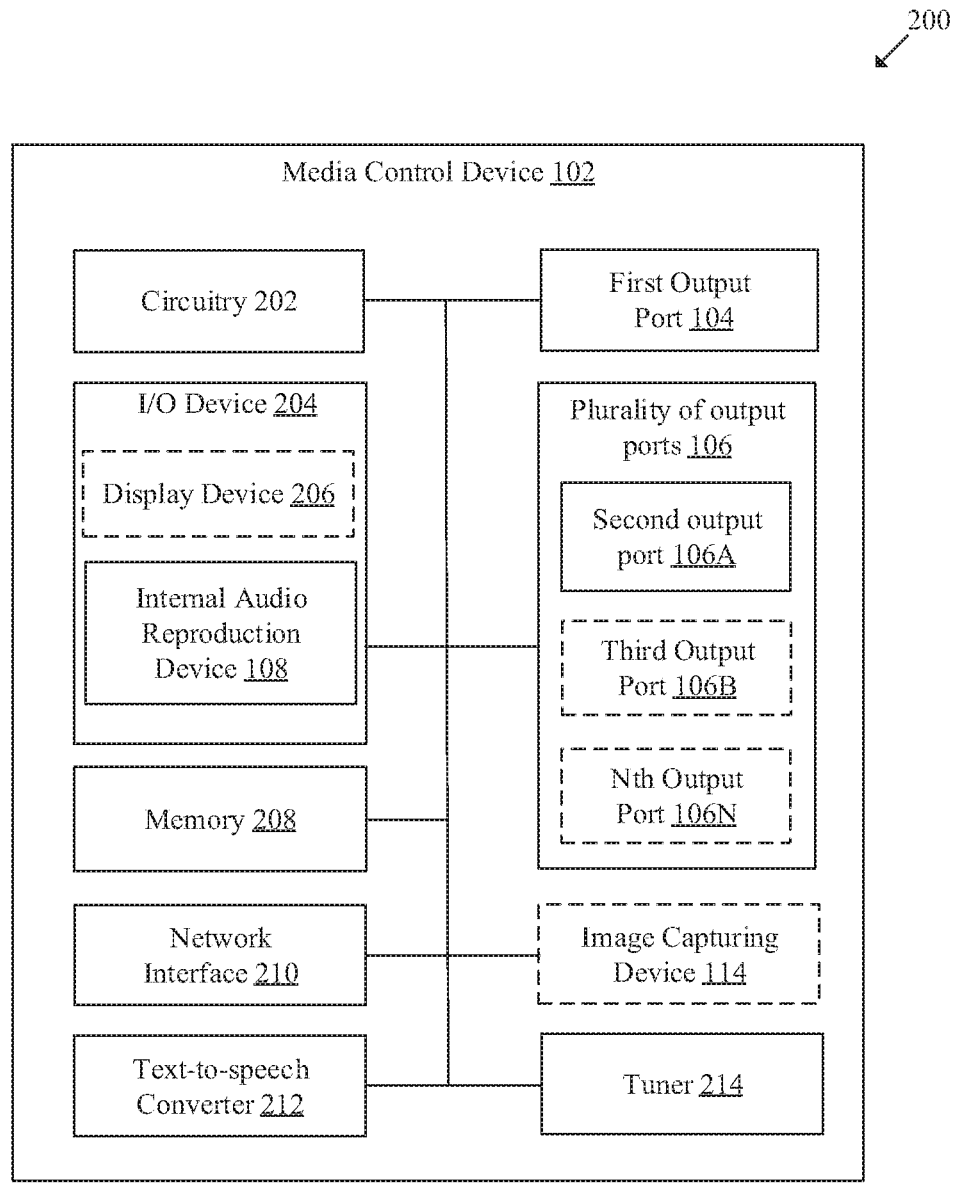
FIG. 2 is a block diagram that illustrates an exemplary media control device of FIG. 1, in accordance with an embodiment of the disclosure.

FIG. 2 is a block diagram that illustrates an exemplary media control device of FIG. 1, in accordance with an embodiment of the disclosure. With reference to FIG. 2, there is shown a block diagram 200 of the media control device 102. The media control device 102 may include circuitry 202, the first output port 104, and the plurality of output ports 106. The plurality of output ports 106 may further include the second output port 106A, the third output port 106B, and the Nth output port 106N. The media control device 102 may further include the image capturing device 114 as the integrated part thereof. The media control device 102 may further include an input output (I/O) device 204 (that may include a display device 206 and the internal audio reproduction device 108), a memory 208, and a network interface 210 through which the media control device 102 may be connected to the communication network 118 (not shown in FIG. 2). Further, the media control device 102 may further include a text-to-speech converter 212, and a tuner 214.

The circuitry 202 may include suitable logic, circuitry, and/or interfaces, that may be configured to execute program instructions associated with different operations to be executed by the media control device 102. For example, some of the operations may include render of the media content, control of the image capturing device 114, reception of the user input indicative of the disability information, control of the first output port 104 to output the first audio portion of the media content, retrieval of the second audio portion which may describe the first image portion of the media content based on the received user input, and control of the second output port to output the first audio portion and the second audio portion based on the received user input. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits. In an embodiment, the first output port 104 and the plurality of output ports 106 are the ports of the processor or the circuitry 202 which may be included in the media control device 102. In such scenario, the first output port 104 and the plurality of output ports 106 may be input/output pins (not shown) of the processor.

The I/O device 204 may comprise suitable logic, circuitry, interfaces, and/or code that may be configured to receive an input (for example the user input) and provide an output based on the received input. The I/O device 204 may include various input and output devices, which may be configured to communicate with the circuitry 202. Examples of the I/O device 204 may include, but are not limited to, a touch screen, a keyboard, a mouse, a joystick, a display device (for example, the display device 206), a microphone, or an audio reproduction device (for example, the internal audio reproduction device 108.

The display device 206 may comprise suitable logic, circuitry, and interfaces that may be configured to display an output of the media control device 102. The display device 206 may be utilized to render the first image portion (for example image frames/shots/scenes) of the media content. In some embodiments, the display device 206 may be an external display device or a display screen associated with the media control device 102. The display device 206 may be a touch screen which may enable a user to provide the user input, such as the disability information via the display device 206. The touch screen may be at least one of a resistive touch screen, a capacitive touch screen, a thermal touch screen or any other touch screen using which inputs may be provided to the circuitry 202. The display device 206 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 206 may refer to a display screen of a head mounted device (HMD), a smart-glass device, a see-through display, a projection-based display, an electro-chromic display, or a transparent display.

The memory 208 may include suitable logic, circuitry, interfaces, and/or code that may be configured to store the one or more instructions to be executed by the circuitry 202. The memory 208 may be configured to store the media content to be rendered. The memory 208 may be further configured to store the user input indicative of the disability information associated with the first user 122A and/or the second user 122B. In some embodiments, the memory 208 may store text information which may describe the first image portion of the media content. The text information may be a text representation of the second audio portion. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 210 may comprise suitable logic, circuitry, and/or interfaces that may be configured to facilitate communication between the media control device 102, the server 116, the image capturing device 114 via the communication network 118. The network interface 210 may be implemented by use of various known technologies to support wired or wireless communication of the media control device 102 with the communication network 118. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The text-to-speech converter 212 may include suitable logic, circuitry, interfaces, and/or code that may be configured to convert text information such as textual description of the first image portion into an audio form, such as the second audio portion. The text-to-speech converter 212 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

A tuner 214 may comprise suitable logic, circuitry, interfaces, and/or code that may be configured to receive the media content (for example AV programs or content) from a radio station, via a radio communication channel (not shown). The tuner 214 may be controlled by the media control device 102 (for example a television) to set at a particular radio frequency (RF) or a RF channel, on which the media content may be received from the radio station. The tuner 21 may be further configured to receive the media content as a RF signal (i.e. that may be an analog or a digital radio transmission signal) and convert the received RF signal into audio and/or video signals. The audio and/or video signals may be further processed to reproduce the audio signals (such as the first audio portion and/or the second audio portion) and the video signals (such as the first image portion) associated with the media content. The tuner 214 may be further controlled to change the RF channel to receive different media contents. The tuner 214 may be further configured to filter or remove noise signals included in the received RF signals associated with the media content. In an embodiment, the tuner 214 may be externally connected to the media control device 102. The tuner 214 may be used for different television standards such as Phase Alternating Line (PAL) standard, Advanced Television Systems Committee (ATSC) standard, National Television System Committee (NTSC) standard, Integrated Services Digital Broadcasting (ISDB) standard and so forth. Examples of the tuner 214 may include, but are not limited to, an analog tuner, a digital tuner, a hybrid tuner, a TV tuner card, a set-top box, and the like.

A person of ordinary skill in the art will understand that the media control device 102 in FIG. 2 may also include other suitable components or systems, in addition to the components or systems which are illustrated herein to describe and explain the function and operation of the present disclosure. A detailed description for the other components or systems of the media control device 102 has been omitted from the disclosure for the sake of brevity. The operations of the circuitry 202 are further described, for example, in FIGS. 3A, 3B, and 3C.

Figure 3A:
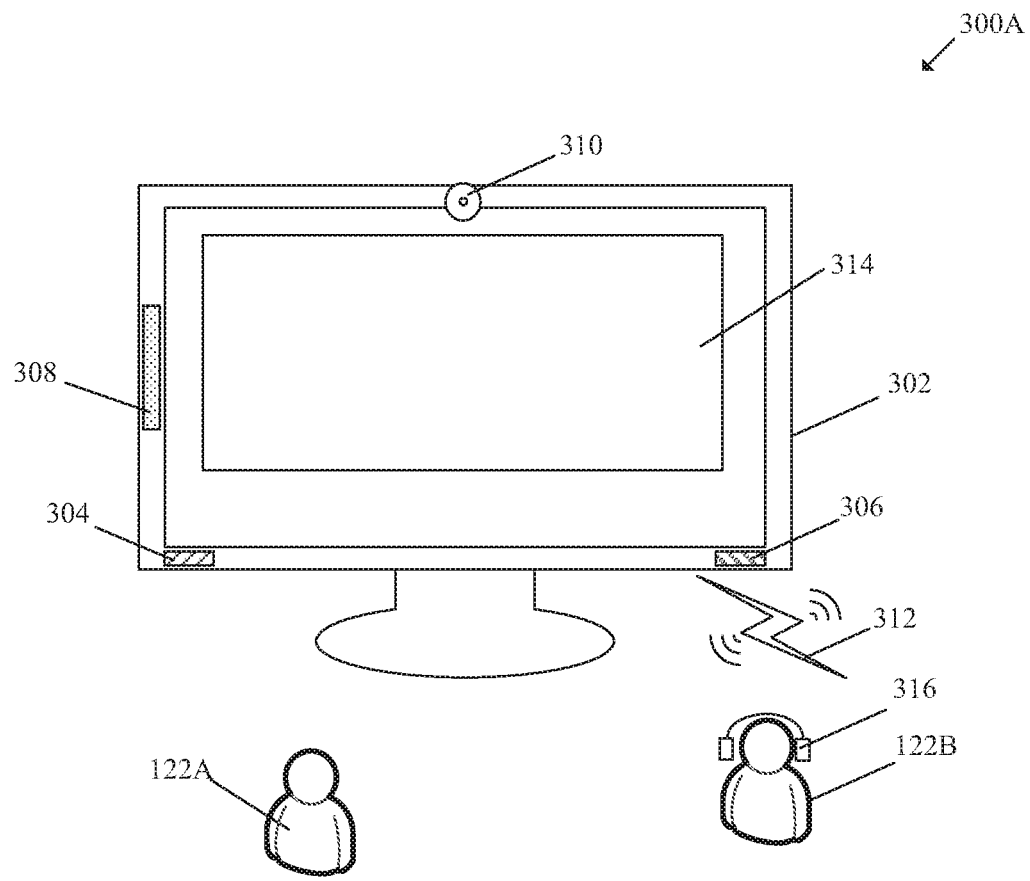
FIGS. 3A-3C are diagrams which collectively illustrate exemplary scenarios for control of output ports of the media control device of FIG. 1, in accordance with an embodiment of the disclosure.
Figure 3B:
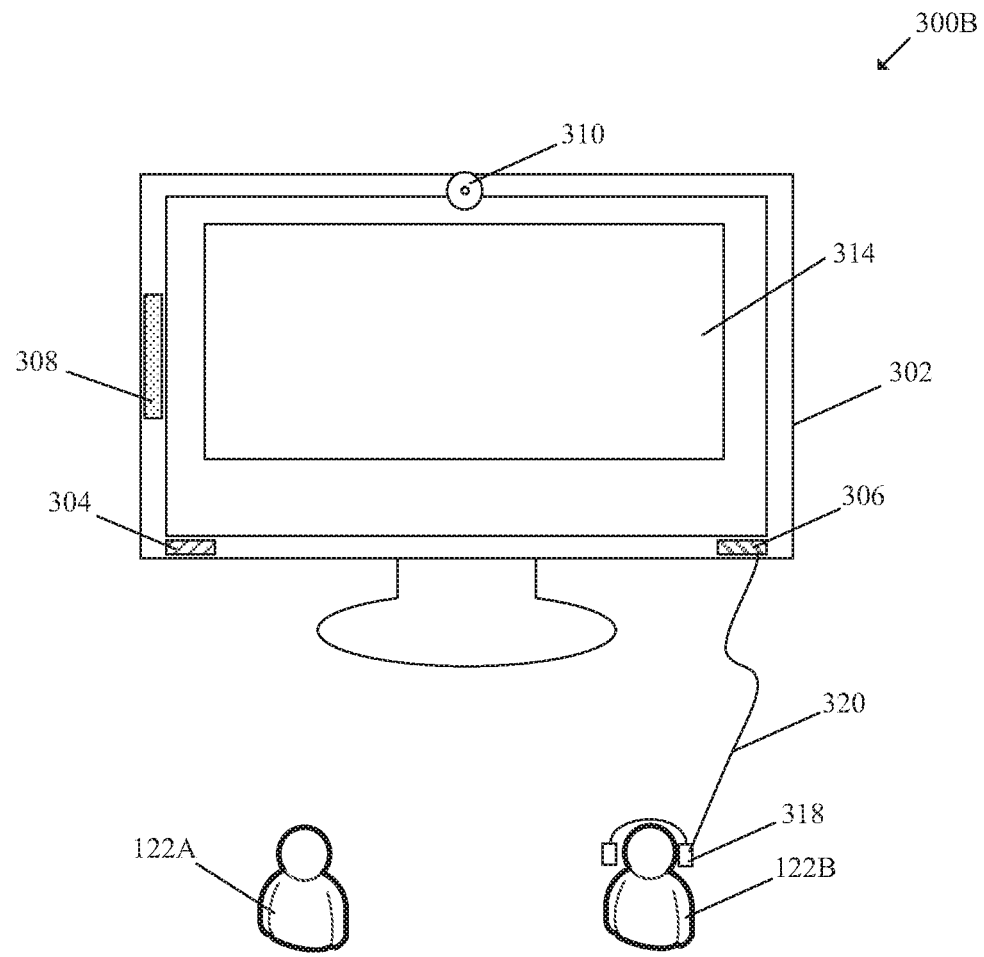
Figure 3C:
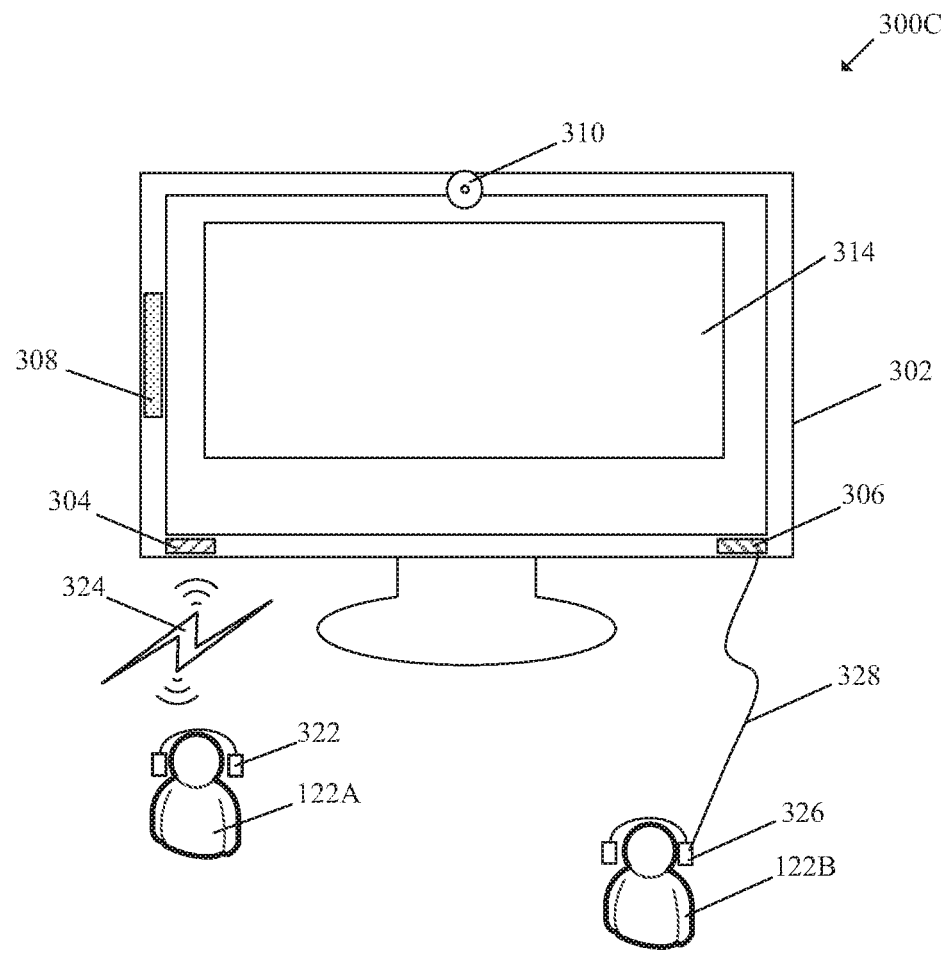

FIGS. 3A-3C are diagrams which collectively illustrate exemplary scenarios for control of output ports of the media control device of FIG. 1, in accordance with an embodiment of the disclosure. FIGS. 3A, 3B, and 3C are explained in conjunction with elements from FIGS. 1 and 2. With reference to FIG. 3A, there is shown a media control device 302 (for example, a television (TV)), a first output port 304, a second output port 306, an internal audio reproduction device 308 (for example, an in-built speaker) an image capturing device 310 (for example, a camera), a wireless communication medium 312, a display device 314 (or a display screen), and a second external audio reproduction device 316.

In an embodiment, the functionality of the media control device 302, the first output port 304, the second output port 306, the internal audio reproduction device 308, the image capturing device 310, the wireless communication medium 312, the display device 314, and the second external audio reproduction device 316 may be similar to the functionalities of the media control device 102, the first output port 104, the second output port 106A, the internal audio reproduction device 108, the image capturing device 114, the wireless communication medium 120, the display device 206, and the second external audio reproduction device 112, respectively, described in FIG. 1. Therefore, the descriptions of the media control device 302, the first output port 304, the second output port 306, the internal audio reproduction device 308, the image capturing device 310, the wireless communication medium 312, the display device 314, and the second external audio reproduction device 316 are omitted from the disclosure for the sake of brevity. The image capturing device 310 may be integrated with the media control device 302, as shown in FIG. 3A.

In FIG. 3A, there is further shown a first user (for example, the first user 122A) and a second user (for example, the second user 122B) associated with the media control device 302. The first user 122A and the second user 122B may be present in a shared viewing environment, where both may be the viewers of media content being rendered on the display device 314 of the media control device 302. The first user 122A and the second user 1228 may be present in a field-of-view (FOV) of the image capturing device 310 associated with the media control device 302. It may be noted that the media control device 302 (as television), the first output port 304, the second output port 306, the internal audio reproduction device 308, and the image capturing device 310, and the second external audio reproduction device 316 shown in FIG. 3A are presented merely as an example. The present disclosure may be also applicable to other types of the media control device 302, the first output port 304, the second output port 306, the internal audio reproduction device 308, the image capturing device 310, and the second external audio reproduction device 316 without deviation from the scope of the disclosure. A description of other types has been omitted from the disclosure for the sake of brevity.

With reference to FIG. 3A, the circuitry 202 of the media control device 302 may be configured to receive a user input indicative of disability information of the second user 1228. In accordance with an embodiment, the circuitry may be configured to control the image capturing device 310 to capture an image of the second user 1228 (such as the visually impaired user). In the shared viewing environment where a plurality of users may be present, the circuitry 202 may be configured to control the image capturing device 310 to capture the image of the plurality of users, such as the first user 122A and the second user 1228. Further, the circuitry 202 may be configured to determine the disability information of one of the plurality of users (like the second user 122B) based on the captured image. The disability information corresponding to the visually impaired user may be determined based on image processing techniques known in the art. For example, the circuitry 202 may receive the image captured by the image capturing device 310 and analyze characteristics of eyes (such as squint in the eye, eye color of a user) or presence of an eye gear (such as eye spectacles or glasses generally used by a visually impaired person) in the image to identify presence of the visual impairment in the user (such as the second user 1228) as the disability information. In some embodiments, the circuitry 202 may consider the disability information identified from the capture image as the received user input. The circuitry 202 may further store the disability information as the user input in the memory 208 of the media control device 302 for further use. In an embodiment, the circuitry 202 may be configured to receive the user input directly from one of the plurality of users present in the shared viewing environment, where the user input may include or indicate the disability information of the plurality of users. In an embodiment, the circuitry 202 may be configured to receive the user input in form of a textual user input, an audio user input or a visual user input, via the I/O device 204. For example, the first user 122A is the visually abled user and the second user 122B is the visually impaired user, in accordance with the FIGS. 3A-3C.

In accordance with an embodiment, the circuitry 202 may be further configured to receive the user input from a visually impaired person, as the user. In an example, the circuitry 202 may be configured to display a question on the display device 314 to receive the user input in form of the textual user input, via the I/O device 204. In an exemplary implementation in FIG. 3A, two users, such as the first user 122A and the second user 1228 present in the shared viewing environment may provide the respective user inputs to indicate that the first user 122A is visually abled, whereas the second user 1228 is visually impaired. In another example, the circuitry 202 may be configured to display the question on the display device 314 as "Is a visually impaired user present, select "Yes" or "No"?". The media control device 302 may allow the first user 122A or the second user 1228 to select the option "Yes", as the second user 1228 is present in the shared viewing environment as the visually impaired person. It may be noted that conventional assistive technologies known in the art may be utilized by the second user 122B (i.e. visually impaired person) to enter the user input to indicate the disability information to the media control device 302. For example, the I/O device 204 may include refreshable braille displays to receive the user input from the second user 1228. In another embodiment, the circuitry 202 may receive the user input (to indicate the disability information), through the image capturing device 310, in a form of hand gestures or head gestures from the user (such as the second user 122B). In an example, the second user 1228 may move their head in a specific manner to indicate presence of the visual impairment in the second user 122B, as the user inputs.

In an embodiment, the circuitry 202 may be further configured to receive the user input corresponding to an output port (like the first output port 304 or the second output port 306) the user wants to utilize to access the media content. For example, the circuitry 202 may receive the user input from the first user 122A who may choose the first output port 304 and receive another user input from the second user 122B who may choose the second output port 306 to access the media content.

In another embodiment, the circuitry 202 may be further configured receive the user input corresponding to the media content or a type of the media content that any one of a user, such as the first user 122A or the second user 122B may need to access. In an example, the circuitry 202 may receive the user input that may indicate a name of a movie (i.e. the media content) from the first user 122A. In another example, the circuitry 202 may receive the user input corresponding to the type of media content, such as "news", from the second user 122B. In accordance with an embodiment, the circuitry 202 may be configured to receive the user input corresponding to number of users in the shared viewing environment, a number of visually impaired users in the shared viewing environment, a type of content, such as the audio content or the audio-video content the users may want to access via the media control device 302, and so forth.

In an embodiment, the circuitry 202 may be configured to retrieve the media content from the server 116 or from the memory 208 of the media control device 302. Examples of the media content may include, but is not limited to, video content, an audio video (AV) content, an interactive audio video content, a slideshow of images including audible tones, or gaming content, or multimedia content. The media content may include a first image portion and a first audio portion. The first image portion may be an image frame or a picture that may be rendered on the display device 314. In some embodiment, the first image portion may be an image shot or a filmed scene currently rendered on the display device 314. The first audio portion of the media content may correspond to dialogues, audible instructions, background music and so forth, associated with the first image portion. For example, the media content may be a movie, and the first audio portion may be the dialogues or the background music associated with the movie or objects included in the first image portion. In another example, the media content may be an interactive video content (such as an interactive game), and audible tones or the background music associated with the game may correspond to the first audio portion. In some embodiments, the media content may be a television program which may be received from a television broadcast station, through the tuner 214. The circuitry 202 may control the tuner 214 to tune to a particular channel frequency to receive the media content from the television broadcast station. The circuitry 202 may be further configured to control the first output port 304 in a manner that only the first audio portion of the media content may be output via the first output port 304. The circuitry 202 may be configured to control the display device 314 to display the first image portion of the media content, and control the first output port 304 to output the first audio portion of the displayed media content at a same time or in synchronization.

In accordance with an embodiment, the circuitry 202 may be further configured to retrieve a second audio portion which may describe the first image portion of the media content. The circuitry 202 may retrieve the second audio portion from the memory 208 based on the received user input (i.e. which indicates that the second user 122B may be visually impaired viewer who may need the second audio portion to understand the displayed first image portion). In an example, the media content is a movie which may include a frame or a scene (such as a scene which shows "a man standing on a cliff") being rendered on the display device 314. Thus, the image frames of the scene (e.g. "a man standing on a cliff") is the first image portion, whereas an audio description of the scene may correspond to the second audio portion. With reference to the abovementioned example, the second audio portion may correspond to an audio message as "A man is standing at an edge of the cliff". It may be noted that such audio descriptions of the image portions of the media content may be beneficial for the visually impaired users (such as the second user 122B) to understand the media content. The second audio portion stored in the memory 208 may be associated with an identifier (for example a label identification) which may uniquely distinguish the second audio portion (i.e. scene description) from the stored first audio portion (i.e. dialogues or background music). The circuitry 202 may be configured to recognize and retrieve the second audio portion from the memory 208 based on the identifier associated and stored with the second audio portion. In some embodiments, the second audio portion may be received or stored as a complete audio track which may also include the first audio portion (i.e. dialogues).

Examples of the second audio portion which may describe the first image portion may include, but are not limited to, description of presence of entities in the first image portion of the media content, description of aesthetics or decor in the first image portion of the media content, description of location of a scene in the first image portion, description of text appearing in the scene, such as title of the media content (for example, title of a movie), description associated with environmental condition in the first image portion, description about emotions of characters included in the first image portion, description about lighting conditions in the first image portion, description about background information, description about transition between filmed shots, description about physical attributes or facial expressions of the character in the first image portion, description about occupation or roles of the character in the first image portion, description about clothing of the character in the first image portion, or description about spatial relationships between the characters portrayed in the first image portion.

The circuitry 202 may be configured to control the first output port 304 to output the first audio portion, such as background music and dialogues associated with the first image portion, when the first image portion may be rendered at the display device 314. In accordance with an embodiment, the memory 208 of the media control device 302 may be configured to store the media content including the first audio portion and the first image portion, and further configured to store text information as a text representation of the second audio portion which may describe the first image portion of the media content. In some embodiment, the text information may be included in the media content. In an embodiment, the circuitry 202 may retrieve the text information from the media content say before the render of the first image portion on the display device 314 and the first audio portion. The circuitry 202 may be further configured to convert the retrieved text information (i.e. which describes the first image portion) into the second audio portion. The circuitry 202 may control the text-to-speech converter 212 to convert the retrieved text information into the second audio output. The text information (i.e. textual form of the scene description) may be associated with the identifier (for example the label identification) which may uniquely distinguish the text information (i.e. scene description) from the stored first audio portion (i.e. dialogues or background music) or from textual form of the first audio portion, like textual subtitle or closed captions. The circuitry 202 may be configured to recognize and retrieve the text information from the memory 208 based on the identifier associated and stored with the text information.

Furthermore, the circuitry 202 may be configured to control the second output port 306 to output the first audio portion (i.e. scene dialogues) and the second audio portion (i.e. scene description) based on the received user input from the second user 122B (i.e. visually impaired). The user input may indicate that the second user 122B is the visually impaired user, who may want the scene description in the audio form to understand the scene (i.e. first image portion) rendered at the display device 314. In an example, the circuitry 202 may receive a choice of an output port (such as the second output port 306) in the user input to receive the audios (first and second audio portions) associated with the media content. The circuitry 202 may further control the second output port 306 to output the first audio portion and the second audio portion based on the user input received from the second user 122B. In some embodiments, the stored second audio portion may be the complete audio track (which may include both the first audio potion, such as dialogues, and the second audio portion, such the audio form of the description). In such case, the circuitry 202 may further control the second output port 306 to output the second audio portion (i.e. complete audio track) based on the user input received from the second user 1228.

The first output port 304 may be utilized by the first user 122A that may be a visually abled user, therefore output of the first output port 304 may exclude the second audio portion that includes audio description of the first image portion of the media content. In an example, in the shared viewing environment shown in FIG. 3A, the first user 122A who may be a visually abled user, may want to access the media content (such as a movie) via the media control device 302. The circuitry 202 of the media control device 302 may receive the user inputs indicative of the disability information of the first user 122A as visually abled, and of the second user 122B as visually disabled. The user inputs may indicate to the media control device 302 that the second user 122B may want the scene description in the audio form (as the second audio portion) for being visually disabled, and the first user 122A may not want the scene description in the audio form as the first user 122A can see the scene description in a text form on the display device 314. Therefore, the circuitry 202 may control the first output port 304 to output the first audio portion (such as dialogues and the background music of the movie) for the first user 122A who is the visually abled user. In accordance with an embodiment, the media control device 302 may further include the internal audio reproduction device 308 which may be connected to the first output port 304 through the wired connection 126 shown in FIG. 1. The wired connection 126 may be an internal connection between the circuitry 202 and the internal audio reproduction device 308 which may also be connected to the first output port 304. The circuitry 202 may be configured to control the internal audio reproduction device 308 (for example an in-built speaker) to output the first audio portion (i.e. dialogues of current scene) of the media content for the first user 122A, as shown in FIG. 3A. In accordance with an embodiment, the output of the first audio portion, through the internal audio reproduction device 308 may exclude the second audio portion (i.e. scene or video description). In an embodiment, the circuitry 202 may be configured to control the internal audio reproduction device 308 (for example in-built speaker) to output the first audio portion of the media content, via the first output port 304, for the first user 122A. In an example, the first user 122A is the visually abled user who may require access to only the first audio portion of the media content. The circuitry 202 may be further configured to display the corresponding first image portion (i.e. scene or images) associated with the first audio portion on the display device 314. In some embodiments, the circuitry 202 may control the display device 314 to display the text information (i.e. scene description in the textual form) along with the output of the first image portion on the display device 314 and the first audio portion on the internal audio reproduction device 308.

In accordance with an embodiment, the circuitry 202 may be configured to retrieve the second audio portion (such as audio description of the scene currently rendered on the display device 314) based on the received user input related to the second user 1228. Further, the circuitry 202 may control the second output port 306 to output the first audio portion as well as the second audio portion for the second user 1228 who is visually impaired. The circuitry 202 may further wirelessly output the first audio portion and the second audio portion to an external audio reproduction device, via the second output port 306, based on the received user input. For example, the external audio reproduction device may be the second external audio reproduction device 316 (for example wireless headset) shown in FIG. 3A.

In accordance with an embodiment, the circuitry 202 may be further configured to adjust a timing of the output of the first audio portion and the second audio portion, via the second output port, such that the output of the first audio portion (i.e. dialogues) may not interfere with the output of the second audio portion (i.e. scene description). The circuitry 202 may adjust the timing of the output of the first audio portion and the second audio portion such that the first audio portion and the second audio portion may be outputted at different time periods, via the second output port 306, to the second external audio reproduction device 316. The circuitry 202 may further control the output of the first audio portion in synchronize with the display of the first image portion of the media content on the display device 206. The circuitry 202 may output the second audio portion (i.e. scene description) during a particular time period which may include a time period which may lie before the output of the first audio portion, a time period between the output of two first audio portions of the current scene or a time period after the output of the first audio portion. In an example, in case, the media content is the audio-video content with a duration of 54 seconds and a particular scene of the audio-video content includes three first audio portions (i.e. dialogues), to be rendered at intervals between 5th second to $14^{th}$ second, $21^{st}$ second to $33^{rd}$ second, and $36^{th}$ second to $44^{th}$ second, respectively. Thus, the circuitry 202 may be configured to adjust the timing of the output of the second audio portion such that the second audio portion may be at the time period which may lie between $0^{th}$ second to 5th second, between $14^{th}$ second to $21^{st}$ second, between $33^{rd}$ sec to $36^{th}$ second, or between $44^{th}$ second to $54^{th}$ second based on a duration of the second audio portion. In other words, the circuitry 202 may identify a gap between the first audio portions (i.e. dialogues) of the currently rendered scene of the media content, and further control the output of the second audio portion (i.e. scene description) between the identified gap.

In an embodiment, the circuitry 202 may wirelessly output the first audio portions (i.e. dialogues) and the second audio portion (i.e. scene description) to the second external audio reproduction device 316 (i.e. similar to the second external audio reproduction device 112), via the second output port 306 as shown in FIG. 3A. The circuitry 202 may wirelessly output the first audio portions and the second audio portion to the second external audio reproduction device 316, through the wireless communication medium 312 (i.e. similar to the wireless communication medium 120 in FIG. 1). The second external audio reproduction device 316 may be a wireless wearable device (for example a wireless headphone or headset) worn by the second user 1228, such that the both the first audio portion and the second audio portion may be received by the second user 122B (i.e. visually impaired). Thus, the disclosed media control device 302 may be able to output the first audio portion (i.e. dialogues) via the internal audio reproduction device 308 (i.e. connected to the first output port 304) for the first user 122A, and at the same time output the first audio portion, via the second output port 306 for the second user 122B (i.e. visually impaired user). However, the disclosed media control device 302 may only output the second audio portion (having the audio scene description) through the second output port 306 (not through the first output port 304), as the second audio portion may be unessential for the first user 122A (i.e. abled user), and may be required by the second user 122B who may be visually impaired and may wanted to receive both the dialogues and the scene description in the audio form through same channel (such as the second output port 306).

In accordance with an embodiment, the circuitry 202 may be further configured to synchronize the first audio portion, outputted via the first output port 304 and via the second output port 306, with the first image portion, outputted via the display device 314. The timing of output of the first audio portion outputted via both the first output port 304 and the second output port 306 may be maintained such that the first audio portion (i.e. dialogues) outputted via both the first output port 304 and the second output port 306 is in synchronization with output of the first image portion (i.e. image frames or scene) via the display device 314. In an example, the first audio portion may be synchronized with the first image portion, such that the dialogues in a particular scene may match or rendered at same time with the corresponding objects (like sound sources, but not limited to, an actor, a musical instrument, an animal or a vehicle) present in the scene (i.e., the first image portion) of the media content. In an embodiment, based on the adjustment of the timing of the output of the first audio portion and the second audio portion, via the second output port 306, the circuitry 202 may delay the reproduction of the first image portion, such that the output of the first image portion via the display device 314 may be in synchronization with the output of the first audio portion, via either of the internal audio reproduction device 308, via the first output port 304, or via the second output port 306.

In accordance with an embodiment, the circuitry 202 may be configured to control the output of the first audio portion, via the first output port 304 or the internal audio reproduction device 308, and control the output of the first audio portion as well as the second audio portion, via the second output port 306, concurrently. Thus, in the shared viewing environment, the disclosed media control device 302 may allow the first user 122A and the second user 1228 to access the media content together as shown in FIG. 3A. Although the first audio portion may be provided at different output ports at a same time for different users (i.e. to allow both the users to access the media content together), the disclosed media control device 302 may also control the output of the second audio portion (i.e. scene description) at the second output port 306 along with the output of the first audio portion (i.e. dialogues), as preferred by the second user 122B (i.e. visual impaired) using the user input.

In accordance with an embodiment, the circuitry 202 may be further configured to receive a plurality of user inputs each indicative of the disability information (for example visual impairment of a plurality of users present in the shared viewing environment. The circuitry 202 may receive the user input from one or more of the plurality of users, who may be visually impaired. The circuitry 202 may be further configured to control the plurality of output ports 106 (which may also include the second output port 306) to output the first audio portion and the second audio portion as well based on the received plurality of user inputs, for the plurality of users. In an embodiment, the circuitry 202 may be configured to output the first audio portion at a first set of the plurality of output ports 106 accessed by able users, and may further output the second audio portion at a second set of the plurality of output ports 106 that may be accessed by the visually impaired users of the plurality of users, where the first set may be different from the second set of the plurality of output ports 106. In an example, in case the shared viewing environment includes four users, such that two users are visually abled and other two users are visually impaired users. The circuitry 202 may output the first audio portion (i.e. dialogues) at the first output port 304, the second output port 306, the third output port 106B (shown in FIG. 1) and a fourth output port (not shown), and further wirelessly output the second audio portion (i.e. scene description) at only the second output port 306 and the fourth output port for the two visually impaired users. The circuitry 202 may output the first audio portion to the internal audio reproduction device 308, via the first output port 104 for the visually abled users, and may further wirelessly output both the first audio portion and the second audio portion (with adjusted timing) to the second external audio reproduction device 316 or to similar headsets, via the second set of the plurality of output ports 106, for the visually impaired users. Therefore, the disclosed media control device 302 may allow the multiple users to access the media content based on their respective preference using the plurality of output ports 106.

With reference to FIG. 3B, there is shown a second external audio reproduction device 318 (for example a wired headphone) which may be connected with the second output port 306, via a cable 320 (similar to the wired connection or cable 124 shown in FIG. 1 to connect the first output port 104 and the first external audio reproduction device 110). With reference to FIG. 3B, there is further shown the shared viewing environment, that includes the first user 122A (for example visually abled) and the second user 122B (for example visually impaired). In accordance with an embodiment, the internal audio reproduction device 308 (i.e. in-built speaker) may internally connected to the first output port 304, as described, for example, in FIG. 3A.

The circuitry 202 may be further configured to control the internal audio reproduction device 308 to output the first audio portion of the media content, via the first output port 304. In some embodiments, the circuitry 202 may directly control the internal audio reproduction device 308 to output or reproduce the first audio portion for the first user 122A (i.e. visually abled) who may require access to only the first audio portion (i.e. dialogues) of the media content, not the scene description in audible form (i.e. the second audio portion). The circuitry 202 may further output the first audio portion and the second audio portion to the second external audio reproduction device 318 (i.e. wired headset), via the second output port 306 and the cable 320, based on the received user input (i.e. indicate disability of the second user 122B). The cable 320 may be connected to a complementary second output port 306 to receive the first audio portion and the second audio portion of the media content. In an example, the cable 320 is an HDMI cable that may be connected to an HDMI output port that may be one port of the plurality of ports 106 (or the second output port 306). The first audio portion and the second audio portion of the media content may be outputted via the second output port 306 to the second external audio reproduction device 318 (i.e. wired headset or headphone) for the second user 122B (i.e. visually disabled) who may require access to both the first audio portion and the second audio portion of the media content through a same channel (i.e. the second output port 306) of the media control device 302. Therefore, with respect to FIG. 3B, the disclosed media control device 302 may concurrently control the internal audio reproduction device 308 (in-built speaker) to output the first audio portion (i.e. dialogues) for the first user 122A, and control the second output port 306 to output both the first audio portion and the second audio portion (i.e. scene description) for the second user 122B using the second external audio reproduction device 318 (i.e. wired headset).

It should be noted that the output of the second audio portion as the scene description, described in FIGS. 1 and 3A-3C, is presented merely as an example. The second audio portion may also include or describe screen information, for example information which may describe one or more graphical user interface (GUI) elements (like, but is not limited to, icons, button, or menus) displayed on the display device 206. In such case, the second audio portion may describe, but is not limited to, movement of highlighted text, description of the GUI elements, movement of the GUI elements, selection or control of the GUI elements (for example volume, channel, or settings buttons).

With reference to FIG. 3C, there is shown a first external audio reproduction device 322 (such as a wireless headphone worn by the first user 122A), a wireless communication medium 324, a second external audio reproduction device 326, (such as a wired headphone worn by the second user 122B) and a wired cable 328. With reference to FIG. 3C, there is further shown the shared viewing environment, that includes the first user 122A (for example visually abled) and the second user 122B (for example visually impaired), where the first user 122A may want to access the first audio portion (i.e. dialogues) of the media content using the first external audio reproduction device 322 (i.e. wireless headphone or headset).

In accordance with an embodiment, the circuitry 202 may be further configured to wirelessly output the first audio portion to the first external audio reproduction device 322 (i.e. wireless headphone) for the first user 122A, via the first output port 304 and the wireless communication medium 324, as shown in FIG. 3C. The wireless communication medium 324 may be similar to the wireless communication medium 120 as shown in FIG. 1 with respect to the second external audio reproduction device 112. In an example, the first user 122A may be the visually abled user who may require access to only the first audio portion (i.e. dialogues) of the media content through the first external audio reproduction device 322 (i.e. wireless headphone as shown in FIG. 3C). The circuitry 202 may be further configured to output the first audio portion (i.e. dialogues) and the second audio portion (i.e. scene description) to the second external audio reproduction device 326 (for example the wired headphone) for the second user 122B, via the second output port 306 and the wired cable 328, based on the received user input from the second user 122B. For example, the wired cable 328 is similar to the wired cable 320 shown in FIG. 3B. The first external audio reproduction device 322 may be different from the second external audio reproduction device 326. In an example, the second user 122B may the visually impaired user who may require access to both the first audio portion and the second audio portion of the media content through the second external audio reproduction device 326 (wired headphone) and the same channel (i.e. the second output port 306) of the media control device 302. Therefore, with respect to FIG. 3C, the disclosed media control device 302 may concurrently control the first output port 304 to wirelessly output the first audio portion (i.e. dialogues) for the first user 122A using the first external audio reproduction device 322, and control the second output port 306 to output both the first audio portion and the second audio portion (i.e. scene description) for the second user 122B using the second external audio reproduction device 326 (i.e. wired headphone or headset). It should be noted that wireless output of the first output port 304, via the first output port 304, and the output of both the first audio portion and the second audio portion, via the second output port 306 in FIG. 3C, is presented merely as an example. In another embodiment, the media control device 302 may concurrently output the first audio portion, via the first output port 304, and wirelessly output the both the first audio portion and the second audio portion, via the second output port 306, without deviation from the scope of disclosure.

It should be noted that the output of the second audio portion as the scene description, described in FIGS. 1 and 3A-3C, is presented merely as an example. The second audio portion may also include or describe screen information, for example information which may describe one or more graphical user interface (GUI) elements (like, but is not limited to, icons, button, or menus) displayed on the display device 206. In such case, the second audio portion may describe, but is not limited to, movement of highlighted text, description of the GUI elements, movement of the GUI elements, selection or control of the GUI elements (for example volume, channel, or setting buttons). In such case, the second audio portion output to the visually impaired user (via the first output port 304 or the second output port 306) may represent a screen reader of the GUI elements or information displayed on the display device 206.

Figure 4:
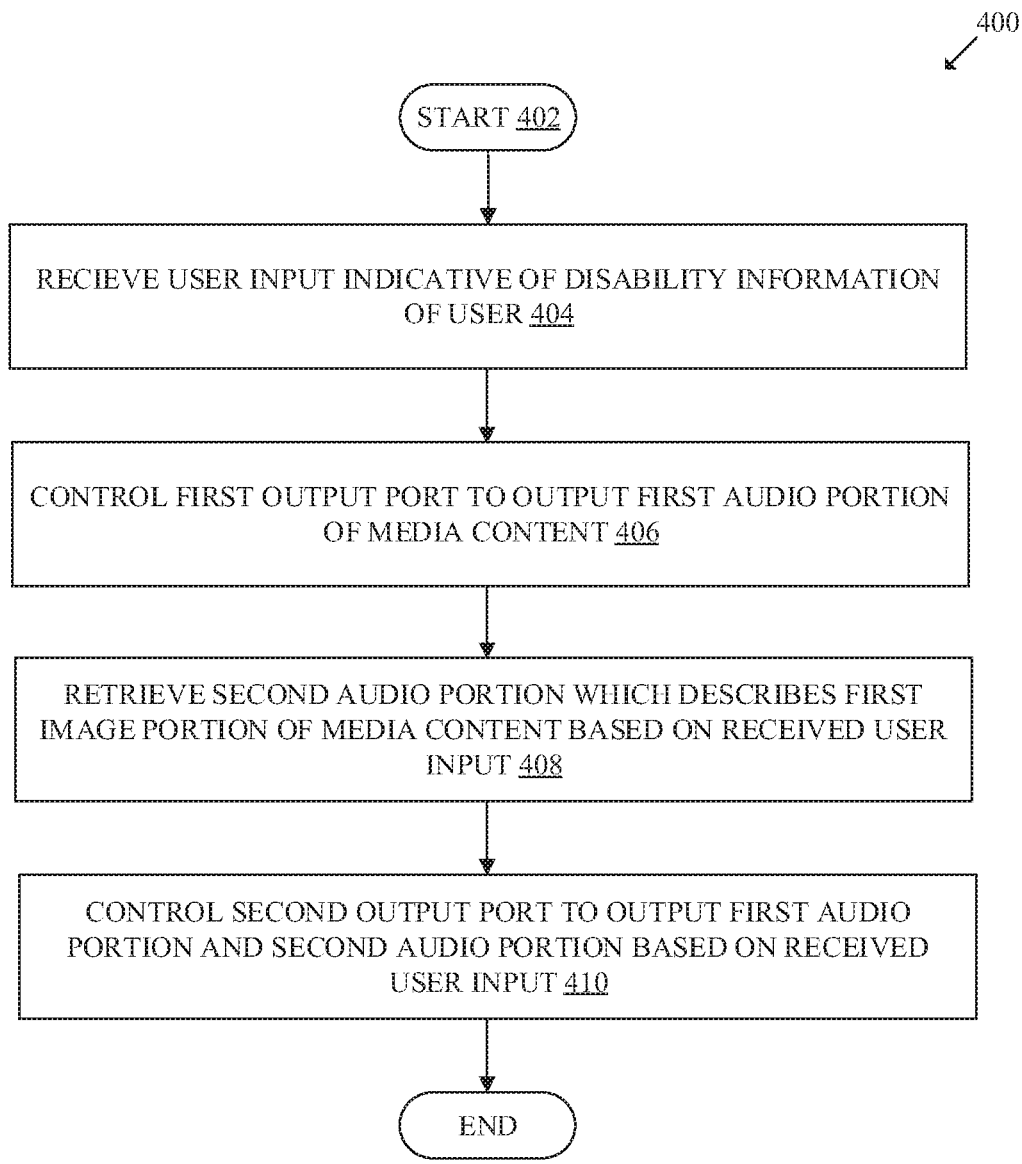
FIG. 4 is a flowchart that illustrates an exemplary method for control of output ports of the media control device, in accordance with an embodiment of the disclosure.

FIG. 4 is a flowchart that illustrates an exemplary method for control of output ports of the media control device, in accordance with an embodiment of the disclosure. FIG. 4 is described in conjunction with elements from FIGS. 1, 2, 3A, 3B and 3C. With reference to FIG. 4, there is shown a flowchart 400. The operations of the flowchart 400 may be executed by a computing system, such as the media control device 102, the media control device 302, or the circuitry 202. The operations may start at 402 and proceed to 410.

At 404, the user input indicative of disability information of a user may be received. In one or more embodiments, the circuitry 202 of the media control device 302 may be configured to receive the user input indicative of the disability information of the user (such as the first user 122A or the second user 122B) as described, for example, in FIG. 3A. In some embodiments, the user input may be received from the image capturing device 310, as described, for example, in FIG. 3A.

At 406, the first output port 304 may be controlled to output the first audio portion of media content. In one or more embodiments, the circuitry 202 of the media control device 302 may be configured to control the first output port 304 to output the first audio portion (i.e. dialogues) of the media content as described, for example, in FIG. 3A. The first output port 304 may be connected to any of the internal audio reproduction device 308 (i.e. for example in-built speaker) or the first external audio reproduction device 110 for output of the first audio portion of the media content.

At 408, the second audio portion which may describe the first image portion of the media content may be retrieved based on the received user input. In one or more embodiments, the circuitry 202 of the media control device 302 may be configured to retrieve the second audio portion associated with the media content based on the received user input as described, for example, in FIG. 3A.

At 410, the second output port 306 to may be controlled to output the first audio portion and the second audio portion based on the received user input. In one or more embodiments, the circuitry 202 of the media control device 302 may be configured to control the second output port 306 to output the first audio portion (i.e. dialogues in audio form) and the second audio portion (i.e. scene description in audio form) for a visually impaired person (such as the second user 122B), based on the received user input as described, for example, in FIG. 3A. The control may pass to end.

Although the flowchart 400 is illustrated as discrete operations, such as 404, 406, 408 and 410, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by a media control device which includes a first output port and a second output port, causes the media control device to execute operations. The operations include reception of a user input indicative of disability information of a user. The operations further include control of the first output port to output a first audio portion of media content. The operations further include retrieval of a second audio portion which describes a first image portion of the media content based on the received user input. The first image portion is associated with the first audio portion. The operations further include control of the second output port to output the first audio portion and the second audio portion based on the received user input.

Exemplary aspects of the disclosure may include a media control device (such as the media control device 102). The media control device 102 may include a first output port (such as the first output port 104), a second output port (such as the second output port 106A) and circuitry (such as the circuitry 202) coupled to the first output port 104 and the second output port 106A. The circuitry 202 may be configured to receive a user input indicative of disability information of a user (such as the first user 122A and the second user 122B). The circuitry 202 may be further configured to control the first output port 104 to output a first audio portion of media content. The circuitry 202 may be further configured to retrieve a second audio portion which describes a first image portion of the media content based on the received user input. The first image portion is associated with the first audio portion. The circuitry 202 may be further configured to control the second output port 106A to output the first audio portion and the second audio portion based on the received user input. In accordance with an embodiment, the output, via the first output port 104, excludes the second audio portion.

In accordance with an embodiment, the media control device 102 further comprises an internal audio reproduction device (such as the internal audio reproduction device 108) connected to the first output port 104. The circuitry 202 may be further configured to control the internal audio reproduction device 108 to output the first audio portion of the media content, via the first output port 104. The circuitry 202 may be further configured to wirelessly output the first audio portion and the second audio portion to an external audio reproduction device (such as the second external audio reproduction device 112), via the second output port, based on the received user input.

In accordance with an embodiment, the media control device 102 further comprises an internal audio reproduction device 108 connected to the first output port 104. The circuitry 202 may be further configured to control the internal audio reproduction device 108 to output the first audio portion of the media content, via the first output port 104. The circuitry 202 may be further configured to output the first audio portion and the second audio portion to an external audio reproduction device (such as the second external audio reproduction device 112), via the second output port, based on the received user input.

In accordance with an embodiment, the circuitry 202 may be further configured to wirelessly output the first audio portion to a first external audio reproduction device (such as the first external audio reproduction device 110), via the first output port. The circuitry 202 may be further configured to output the first audio portion and the second audio portion to a second external audio reproduction device (such as the second external audio reproduction device 112), via the second output port, based on the received user input. The first external audio reproduction device 110 may be different from the second external audio reproduction device 112. In accordance with an embodiment, the circuitry 202 may be further configured to control the output of the first audio portion, via the first output port 104, and control the output of the first audio portion and the second audio portion, via the second output port 106A, concurrently.

In accordance with an embodiment, the media control device 102 further comprises a plurality of output ports (such as the plurality of output ports 106) which include the second output port 106A. The circuitry 202 may be further configured to receive a plurality of user inputs each indicative of the disability information of a plurality of users. The circuitry 202 may be further configured to control the plurality of output ports 106, to output the first audio portion and the second audio portion based on the received plurality of user inputs.

In accordance with an embodiment, the media control device 102 may further comprise a memory (such as the memory 208) configured to store the media content including the first audio portion and the first image portion, and configured to store text information which describes the first image portion of the media content. The circuitry 202 may be further configured to convert the stored text information, which describes the first image portion, into the second audio portion.

In accordance with an embodiment, the circuitry 202 may be further configured to adjust a timing of the output of the first audio portion and the second audio portion, via the second output port 106A. In accordance with an embodiment, the circuitry 202 may be further configured to synchronize the first audio portion, outputted via the first output port 104 and the second output port 106A, and the first image portion, outputted via a display device (such as the display device 206). In accordance with an embodiment, the circuitry 202 may be further configured to receive the user input from a visually impaired person, as the user (such as the second user 122B).

In accordance with an embodiment, the media control device 102 may further comprise an image capturing device (such as the image capturing device 114). The circuitry 202 may be further configured to control the image capturing device 114 to capture an image of the user. The circuitry 202 may be further configured to determine the disability information of the user based on the captured image. The circuitry 202 may be further configured to control the second output port 106A to output the first audio portion and the second audio portion based on the determined disability information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A media control device, comprising:
    a first output port;
    a second output port different from the first output port;
    an image capturing device; and
    circuitry, coupled to the first output port, the second output port, and the image capturing device, wherein the circuitry is configured to:
        control the first output port to output a first audio portion of media content, wherein the first audio portion is associated with an image portion of the media content;
        control the image capturing device to capture an image of a user;
        determine a visual impairment of the user, based on at least one of characteristics of eyes of the user or a presence of an eye gear of the user in the captured image of the user;
        determine disability information of the user, based on the determined visual impairment of the user;
        retrieve a second audio portion based on the determined disability information, wherein the second audio portion is an audio form of a description of content of the image portion;
        identify a gap in the first audio portion during which the second audio portion is playable, wherein the gap is identified based on a duration of the second audio portion;
        adjust a timing of output of the first audio portion and the second audio portion based on the identified gap; and
        control the second output port to output each of the first audio portion and the second audio portion based on the determined disability information and the adjusted timing of the first audio portion and the second audio portion.

2. The media control device according to claim 1, wherein the second audio portion includes the first audio portion.

3. The media control device according to claim 1, wherein the output, via the first output port, excludes the second audio portion.

4. The media control device according to claim 1, further comprising:
    an internal audio reproduction device connected to the first output port, wherein the circuitry is further configured to:
        control the internal audio reproduction device to output the first audio portion of the media content, via the first output port; and
        wirelessly output each of the first audio portion and the second audio portion to an external audio reproduction device, via the second output port, wherein the output of each of the first audio portion and the second audio portion is based on the determined disability information.

5. The media control device according to claim 1, further comprising:
    an internal audio reproduction device connected to the first output port, wherein the circuitry is further configured to:
        control the internal audio reproduction device to output the first audio portion of the media content, via the first output port; and
        output each of the first audio portion and the second audio portion to an external audio reproduction device, via the second output port, wherein the output of each of the first audio portion and the second audio portion is based on the determined disability information.

6. The media control device according to claim 1, wherein the circuitry is further configured to:
    wirelessly output the first audio portion to a first external audio reproduction device, via the first output port; and
    output each of the first audio portion and the second audio portion to a second external audio reproduction device, via the second output port, wherein
        the output of each of the first audio portion and the second audio portion is based on the determined disability information, and
        the first external audio reproduction device is different from the second external audio reproduction device.

7. The media control device according to claim 1, wherein the circuitry is further configured to:
    control the output of the first audio portion, via the first output port; and
    control the output of each of the first audio portion and the second audio portion, via the second output port, concurrently.

8. The media control device according to claim 1, further comprising:

a plurality of output ports which include the second output port, wherein the circuitry is further configured to:
  receive a plurality of user inputs, wherein each of the plurality of user inputs is indicative of the disability information of a plurality of users; and
  control the plurality of output ports to output each of the first audio portion and the second audio portion based on the received plurality of user inputs.

9. The media control device according to claim 1, further comprising:
  a memory configured to store:
    the media content that includes the first audio portion and the image portion, and
    text information which describes the image portion of the media content, wherein the circuitry is further configured to convert the stored text information into the second audio portion.

10. The media control device according to claim 1, wherein
  the circuitry is further configured to synchronize the first audio portion and the image portion,
  the first audio portion is outputted via the first output port and the second output port, and
  the image portion is outputted via a display screen.

11. The media control device according to claim 1, wherein
  the circuitry is further configured to receive a user input from a visually impaired person, as the user, and
  the determination of the disability information is further based on the received user input.

12. The media control device according to claim 1, wherein the content of the image portion includes at least one of a plurality of entities in the image portion, one of aesthetics or decor in the image portion, a scene in the image portion, a text in the scene, a title of the media content, environmental condition in the image portion, an emotion of a character in the image portion, one of physical attributes of the character, facial expressions of the character, or clothing of the character in the image portion.

13. The media control device according to claim 1, wherein
  the circuitry is further configured to receive, through the image capturing device, a user input indicative of the disability information, and
  the user input is one of a hand gesture or a head gesture of the user.

14. A method, comprising:
  in a media control device, which includes an image capturing device, a first output port, and a second output port different from the first output port:
    controlling the first output port to output a first audio portion of media content, wherein the first audio portion is associated with an image portion of the media content;
    controlling the image capturing device to capture an image of a user;
    determining a visual impairment of the user, based on at least one of characteristics of eyes of the user or a presence of an eye gear of the user in the captured image of the user;
    determining disability information of the user, based on the determined visual impairment of the user;
    retrieving a second audio portion based on the determined disability information, wherein the second audio portion is an audio form of a description of content of the image portion;
    identifying a gap in the first audio portion during which the second audio portion is playable, wherein the gap is identified based on a duration of the second audio portion;
    adjusting a timing of output of the first audio portion and the second audio portion based on the identified gap; and
    controlling the second output port to output each of the first audio portion and the second audio portion based on the determined disability information and the adjusted timing of the first audio portion and the second audio portion.

15. The method according to claim 14, wherein the output, via the first output port, excludes the second audio portion.

16. The method according to claim 14, further comprising:
  controlling the output of the first audio portion, via the first output port; and
  controlling the output of each of the first audio portion and the second audio portion, via the second output port, concurrently.

17. The method according to claim 14, further comprising:
  controlling an internal audio reproduction device to output the first audio portion of the media content, via the first output port, wherein the internal audio reproduction device is connected to the first output port; and
  wirelessly outputting the first audio portion and the second audio portion to an external audio reproduction device, via the second output port, wherein the output of each of the first audio portion and the second audio portion is based on the determined disability information.

18. The method according to claim 14, further comprising:
  controlling an internal audio reproduction device to output the first audio portion of the media content, via the first output port, wherein the internal audio reproduction device is connected to the first output port; and
  outputting the first audio portion and the second audio portion to an external audio reproduction device, via the second output port, wherein the output of each of the first audio portion and the second audio portion is based on the determined disability information.

19. The method according to claim 14, further comprising:
  wirelessly outputting the first audio portion to a first external audio reproduction device, via the first output port; and
  outputting the first audio portion and the second audio portion to a second external audio reproduction device, via the second output port, wherein
    the output of each of the first audio portion and the second audio portion is based on the input determined disability information, and
    the first external audio reproduction device is different from the second external audio reproduction device.

20. A non-transitory computer-readable medium having stored thereon, computer-executable instructions that when executed by a media control device which includes an image capturing device, a first output port, and a second output port, causes the media control device to execute operations, the operations comprising:

controlling the first output port to output a first audio portion of media content, wherein the first audio portion is associated with an image portion of the media content;

controlling the image capturing device to capture an image of a user;

determining a visual impairment of the user, based on at least one of characteristics of eyes of the user or a presence of an eye gear of the user in the captured image of the user;

determining disability information of the user, based on the determined visual impairment of the user;

retrieving a second audio portion based on the determined disability information, wherein the second audio portion is an audio form of a description of content of the image portion;

identifying a gap in the first audio portion during which the second audio portion is playable, wherein the gap is identified based on a duration of the second audio portion;

adjusting a timing of output of the first audio portion and the second audio portion based on the identified gap; and controlling the second output port to output each of the first audio portion and the second audio portion based on the determined disability information and the adjusted timing of the first audio portion and the second audio portion.

* * * * *